United States Patent [19]

Nelson et al.

[11] 4,322,619

[45] Mar. 30, 1982

[54] OPTICAL MASKING RADIOGRAPHY

[75] Inventors: James A. Nelson; James A. Sorenson, both of Salt Lake City, Utah

[73] Assignee: University of Utah, Salt Lake City, Utah

[21] Appl. No.: 93,027

[22] Filed: Nov. 9, 1979

[51] Int. Cl.³ .............................................. G03B 41/16
[52] U.S. Cl. ...................................... 250/323; 250/505
[58] Field of Search ........................ 250/323, 320, 505

[56] References Cited

U.S. PATENT DOCUMENTS

| | | | |
|---|---|---|---|
| 2,379,814 | 7/1945 | McFarland | 250/323 |
| 3,121,792 | 2/1964 | Mittelstaedt | 250/323 |
| 3,486,022 | 12/1969 | Matuda et al. | 250/320 |

*Primary Examiner*—Alfred E. Smith
*Assistant Examiner*—T. N. Grigsby
*Attorney, Agent, or Firm*—Trask & Britt

[57] ABSTRACT

A first x-ray film is made of an object which is of the type where the image on the film has underexposed portions with low optical contrast. An optical mask film is made from the first x-ray film by transferring the image of the object from the first x-ray film onto a photographically positive print film with duplicating means and an optical blurring means to produce an optically blurred positive image reflective of the object with exposed portions related to the underexposed portions of the first x-ray film. A second x-ray film is made of the object with the optical mask film positioned and registered with respect to the second x-ray film and with respect to the image reflective of the object to be formed on the second x-ray film by the x-ray means, to produce an optically masked image reflective of the object with the underexposed portions of the first x-ray film on the second x-ray film more exposed and with higher optical contrast with respect to the first x-ray film.

14 Claims, 7 Drawing Figures

OPTICAL MASKING RADIOGRAPHY

BACKGROUND OF THE INVENTION

1. Field:

This invention relates to radiography, including medical chest radiography. More particularly, this invention discloses an optical masking technique to improve the observed contrast on a radiograph.

2. State of the Art:

Since the discovery of the x-ray in the late 19th century, x-ray techniques or radiographing techniques have become widely used in a wide range of activities in both the medical and non-medical fields. For example, in the medical field, x-ray techniques are a major diagnosing tool. In non-medical areas, the x-ray has developed into a tool for use in, for example, quality control of structural steel welds.

In the medical area, the chest x-ray has become a widely used, almost common, diagnosing tool for discovering a wide variety of afflictions. A basic problem in chest radiography is the limited latitude of x-ray film. Even with so-called "latitude film", some areas of the radiographic chest image, such as the central mediastinum and the peripheral areas of the lung may be underexposed and suffer from poor contrast. Even relatively dense structures, such as vertebral bodies, may be poorly visualized as a result.

High voltage techniques (220–350 kilo/volt/peak) have been suggested as a means for obtaining improved penetration. Improved penetration, and in turn improved image contrast, in these areas is the objective. W. P. Dyke, J. P. Barbour: *Depth Resolution: A Mechanism By Which High Kilovoltage Improves Visibility In Chest Films;* Radiology 117:159–164, October 1975. The high kilovoltage technique requires special generators and tubes for the x-ray apparatus or machine. Such equipment is expensive. Further, images or radiographs produced suffer decreased contrast in other areas of the chest image, e.g., in the lung fields, because of decreased attenuation coefficients for both soft tissue and bone, and because of increased scatter radiation. "Trough" filters have also been employed to obtain a more balanced film density between the lungs and mediastinum. These filters are difficult to use because a single filter cannot be constructed to simulate accurately the wide variations of patient anatomy that are encountered. Frequently, the trough filter generates a "shadow" which is seen clearly and becomes an annoying superimposed structure on the chest film (radiograph).

The particular problem encountered is specifically associated with the chest and mediastinum areas. That is, the chest provides a wide range of different densities as to the x-ray radiation so that the x-ray film in turn is overexposed and underexposed. In particular, the lung areas contain air (low density) so that the film in that area is rather well exposed. The x-ray radiation penetrates thoroughly and generates an exposed portion which is sufficiently dark for visualization purposes when the film is visually examined. In other areas, such as the mediastinum and heart areas, the film is underexposed. That is, the body is quite thick and relatively solid (higher density) resulting in substantial absorption of x-ray radiation in those areas. The film, in turn, is underexposed (light or white) and suffers from a substantial lack of visual contrast. This inhibits, and may even preclude, visualization and interpretation in these areas.

Similar problems are experienced for other radiography applications. That is, any time an object to be radiographed has varying or differing densities as to the x-ray radiation, the x-ray film may have underexposed areas with low optical or visual contrast. An improved method or technique to improve the exposure of the underexposed areas and in turn the optical contrast or visually observable contrast of radiographs, and particularly medical radiographs, is desirable.

Some masking techniques have been suggested for improving images on film or photographs. See for example: W. F. Schreiber, *Image Processing For Quality Improvement,* Proceedings of the IEEE (Vol. 66, No. 12, December 1978, pp. 1640–1651); K. R. Kattan, M. C. Caplan, B. Felson, *A Method For Improving Roentgenographic Illustrations For Publication—Blurred Undersubtraction (BUS),* Medical Radiography and Photography (Vol. 49, No. 1, 1973, pp. 21–22); D. F. Malin, W. J. Zealey, *Astrophotography With Unsharp Masking,* Sky and Telescope (April 1979). Such techniques are, in effect, laboratory procedures which are not practical for daily use. These references do not disclose a simple technique and apparatus for the production of improved readable radiographs, and in particular medical radiographs, and more particularly chest radiographs.

SUMMARY OF THE INVENTION

An optical masking radiograph method is comprised of a making of a first x-ray film, the making of an optical mask film from the first x-ray film, and then the making of a second or final x-ray film using the optical mask. In particular, the first x-ray film is made of an object with the object and the x-ray means positioned in respective first positions. An image is produced on the first x-ray film reflecting the object. The object is of the type that the image on the film has underexposed portions with low optical contrast.

The optical mask film is made from the first x-ray film by transferring the image of the object from the first x-ray film onto a photographically positive print film with duplicating means. An optically positive image reflective of the object is produced on the mask film with exposed portions relating to the underexposed portions of the first x-ray film.

The second x-ray film of the object is made with the object positioned essentially in its first position. The x-ray means is positioned in a second position preselected to relate to the first position of the x-ray means. The optical mask film is positioned and registered with respect to the second x-ray film and with respect to the image reflective of the object to be formed on the second x-ray film. An optically masked image reflective of the object is produced. The underexposed portions of the first x-ray film on the second x-ray film are more exposed with higher optical contrast with respect to the first x-ray film.

The image from the first film is transferred onto the optical masked film with duplicating means which preferably includes optical blurring means to produce an optically blurred positive image reflective of the image on the first x-ray film. The duplicating means may be a duplicating box of the type having means to pass exposing radiation (such as light) from exterior to interior the box to expose film positioned therewithin. The first x-ray film, the optical blurring means and the optical mask film, are positioned sequentially interiorly from the means to pass the exposing radiation within the box. The optical mask film is exposed most preferably for a preselected period of time which may be from a few seconds to several minutes. The exposure time is chosen so that the optical mask film will have an optical density for exposed portions corresponding to underexposed portions on the first x-ray film from about 0 to about 0.2, and from about 1.0 to about 2.0 for those portions corresponding to adequately exposed portions of the first x-ray film.

The first x-ray film is preferably a conventional x-ray film taken by x-ray means at a preselected voltage for a preselected exposure period with preselected film type. The first x-ray film is preferably a fast x-ray film. The x-ray means preferably includes a fast screen proximate the first x-ray film. The x-ray means also may include a conventional grid and may be preferably operated at a preselected voltage of about 60 kVp to about 150 kVp and for chest radiography preferably about 120 kVp to about 140 kVp.

The second x-ray film is also a conventional x-ray film taken by the x-ray means at a preselected voltage for a preselected exposure period with a preselected film type. The second x-ray film is preferably moderate speed, moderate contrast film. The exposure period for the second x-ray film is preferably from about two to about three times the exposure period as would be required for the selected film-screen combination when used without the optical mask.

The second x-ray film is preferably positioned in a film cassette having a front and rear screen with the optical mask film positioned between the front screen and the second x-ray film.

The objects to be radiographed include the chest of a patient.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
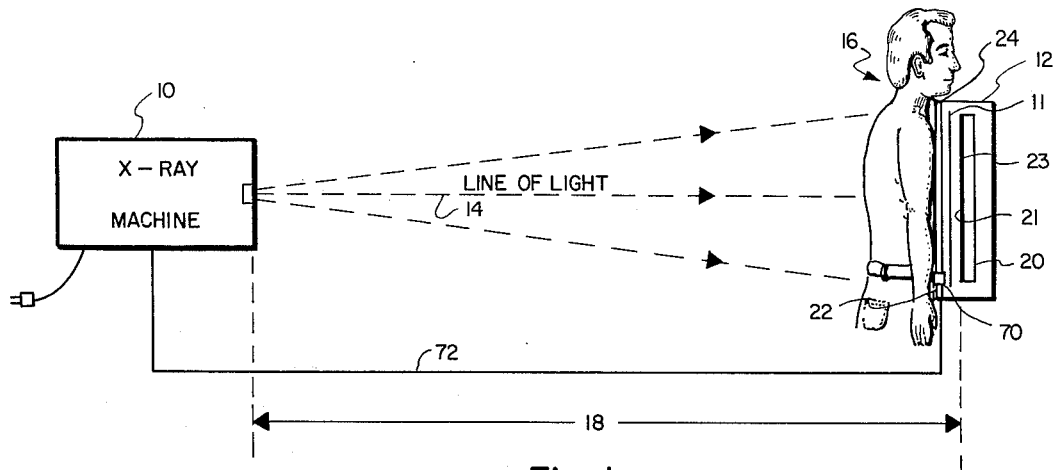
FIG. 1 is a partial representation of an x-ray means for practicing the method of the instant invention.

FIG. 1 is a sketch depicting an x-ray machine arrangement. The x-ray machine 10 may be any conventional or unconventional x-ray machine, as the case may be. The x-ray machine 10 includes or has associated therewith a grid 11 in a film cassette holder 12 all positioned in the line of sight 14 of the x-ray radiation which emanates from the x-ray machine in the direction of the holder 12. The x-ray machine 10 may include a timer, various dials to adjust the voltage level to be applied to the x-ray tube associated therewith, and in turn control the characteristics of the x-ray radiation to be generated and other controls, including positioning controls, typically associated with x-ray machines.

In FIG. 1, a patient 16 is illustrated in position for the taking of a conventional chest x-ray film. Solid objects and the like may also be x-rayed, if desired. The x-ray machine 10 is positioned at a distance 18 away from the x-ray film, which is positioned within a film cassette 20 located and removably mounted within the film cassette holder 12. The distance 18 may be referred to as the focus to film distance (FFD) or target to film distance (TFD). In the instant embodiment, the preferred distance is from about one meter to about three meters and preferably at about three meters. The patient 16 is preferably positioned with the chest up against the face or front 22 of the film cassette holder 12. In some circumstances, a chin holder 24 or similar device is affixed to the top of the film holder 12 so that the patient may position his or her chin therein in order to properly orient themselves at a fixed location in front of the film cassette 20. Other devices may be used (e.g., footprints on the floor) so that the patient may be properly oriented in front of the film cassette 20.

Initially, a first x-ray film of the patient 16 (or object as the case may be) is made with x-ray means of the type shown in FIG. 1. Using a conventional x-ray machine 10 for chest radiography, the initial or first x-ray film is preferably obtained using about 120 kVp to about 140 kVp (kilo-volts-peak) voltage with an anti-scatter grid 11 on a fast x-ray film such as Kodak OH film. Further, fast screens 21, such as a Kodak LANEX, are preferably positioned on the front and back of the cassette 20, as more fully illustrated with respect to FIG. 3. As known to those skilled in the art, the x-ray radiation which passes through the patient 16 (or other object) which is not attenuated or absorbed, activates a substrate on the surface of the screen 21. The substrate in turn generates or emits light in relation to the incident x-ray radiation to expose a photographically negative film, such as the Kodak OH film, positioned within the cassette 20. As also known to those skilled in the art, the anti-scatter grid 11 is used to exclude scattered radiation by selective filtration of randomly directed scattered radiation relative to the direction of the directly transmitted beam, to improve the contrast, and in turn the quality of the image created on the x-ray film within the cassette 20.

The first x-ray film is a conventional x-ray film made at between about 60 kVp and about 150 kVp, and for chest radiography preferably from about 120 kVp to about 140 kVp, with an anti-scatter grid, with a fast film-screen combination, such as Kodak OH film and Kodak LANEX screen. The film is typically exposed for a period of about 1/60th of a second. Those skilled in the art will recognize that other film, screen and exposure combinations may be selected as desired by the user for any one of the numerous different particular applications. The preferred film, screen and exposure combination is selected in this embodiment to produce a good x-ray and to minimize the entrance exposure or radiation level at the skin which is about 3 milliroentgoens. Further, the above combination is selected in order to produce an x-ray film of sufficient quality for the making of the optical mask film as hereinafter described. After the film is exposed, it is developed using conventional developing apparatus and techniques or any apparatus or technique desired by the user to produce a conventional developed x-ray film.

The optical mask film is made from the first x-ray film to act as an optical mask in the making of a second x-ray film, as hereinafter more fully described. The optical mask film is made by transferring the image of the first x-ray film onto a photographically positive print film, such as in this embodiment, DuPont CRONEX type MRF-42 film. Thereafter, the film is developed by any means or method known to those skilled in the art. The transfer is made by the use of duplicating means to produce an optically positive image reflective of the object with exposed (white or clear) portions relating to the underexposed portions (white or clear) of the first x-ray film.

Figure 2:
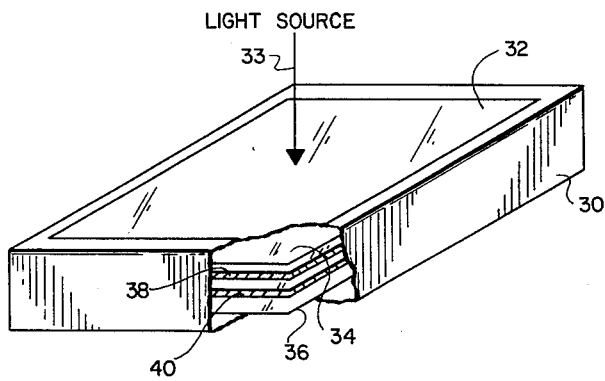
FIG. 2 is a perspective cut-away view of a duplicating box for making an optical mask film for use in practicing the method of the instant invention.

FIG. 2 is a simplified illustration of a duplicating box 30 which can be used as a duplicating means for transferring the image from the first x-ray film to the optical mask film. The duplicating box 30, which may be a conventional duplicating box, has a window 32 to pass exposing radiation, such as light 33, from external the box 30 to interior thereof. The light 33 passes through the developed first x-ray film 34 to expose the optical mask film 36 positioned sequentially interior from the window 32 which constitutes passing means. Preferably, optical blurring means are positioned between the first x-ray film 34 and the optical mask film 36. As here illustrated, the optical blurring means is comprised of one or more layers 38 and 40 of plastic or glass, each of which are somewhat translucent. One or more layers of plastic or glass may be used, as desired by the user. The optical blurring means consisting of layers 38 and 40 diffuses the exposing radiation, i.e., light 33, as it passes from the first x-ray film 34 to the optical mask film to create on the optical mask film a blurred positive image reflective of the object with underexposed portions related to the underexposed portions of the first x-ray film. With transparent glass or plastic layers the total thickness of the layer should be about ¾ inch thick. With somewhat opaque optical diffusing glass or plastic the total thickness of the layers 38 and 40 should be about ¼ inch thick. Other means for producing a blurred optical mask may be used, as known to those skilled in the art. However, the plastic or glass blurring means is preferred.

It should be noted that in the making of the optical mask film, the exposure time is somewhat important in determining the overall optical effect of the mask. That is, if the optical mask is somewhat underexposed (or overexposed) it will be too dark (or too light) to cause the desired masking effect, as hereinabove described. The optional exposure time will be somewhere between a few seconds (e.g., about ten seconds) to several minutes (e.g., about five minutes) when fabricating or transferring the image from the first x-ray film to the optical mask film depending on the type of film on which the mask is recorded and the intensity of the exposing radiation 33. The exposure time is further based on the type and thickness of the optical blurring plates 38 and 40 used in the duplicating process in transferring the image from the first x-ray film to the optical mask film. The thicker and more opaque the blurring plates that are used, the longer or the larger the required exposure time. The exposure time is based somewhat on judgment and experience, which can be readily obtained by operators with one or two test runs.

Figure 4:
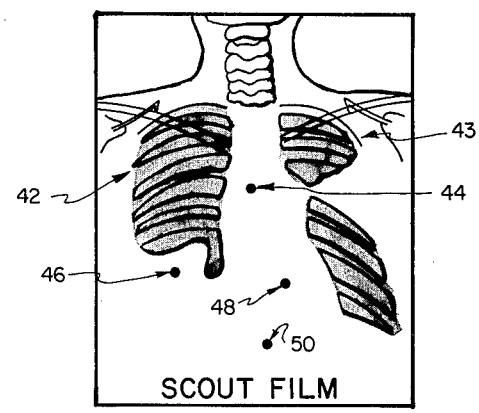
FIG. 4 is a representative shaded form reflecting the first x-ray film made when practicing the method of the instant invention.

Referring to FIG. 4, a shaded image of a chest x-ray is depicted, albeit poorly. That is, the depiction does not adequately illustrate the gray shading. Only a photograph or the film itself can illustrate the varying shades of gray which would be observed on a developed conventional x-ray film positioned for viewing on viewing means, as known to those skilled in the art. Nonetheless, FIG. 4 depicts an important aspect of the process here involved. That is, it illustrates a dark area 42 in the lung area which is typically associated with an adequately exposed or overexposed area of a conventional radiograph. The mediastinum is illustrated at the dot 44 as substantially underexposed from the viewpoint that on a conventional x-ray it would appear substantially underexposed and clear or white. Similar underexposed areas appear at the dots randomly positioned at 46, 48 and 50. In the areas of underexposure 46, 48 and 50, as well as 44, very low or minimal optical contrast is observable. In some films, no observable contrast is extant. Thus, the viewer would have a difficult time interpreting or seeing anything, and in turn be unable to interpret, and in turn diagnose.

Figure 5:
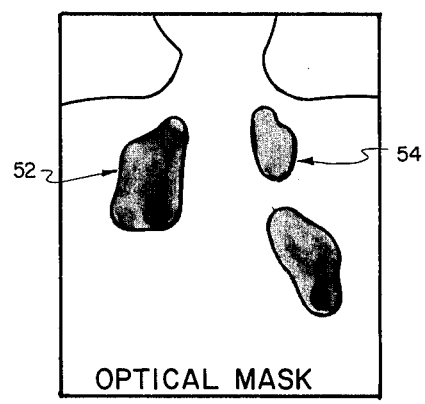
FIG. 5 is a representative shaded form of the optical mask film with a blurred optical image thereon of the optical mask film made when practicing the method of the instant invention.

FIG. 5 illustrates the mask film fabricated in the duplicating means with optical diffusing means. By use of the optical diffusing means, shaded gray areas 52, 54 appear related to the shaded areas 42 and 43 of the scout film shown in FIG. 4. When using optical diffusing means, a very blurred image having decreasing shades of gray from black or dark towards white along its edges is produced. The blurred character of the optical mask facilitates mask usage by precluding the necessity for precise registering of the x-ray machine, the patient or object, and the film holder and cassette in the taking of a second x-ray film, and eliminates obvious shadows of the mesh itself from appearing on the second x-ray film, as more fully discussed hereinafter.

The second x-ray film is taken using conventional x-ray techniques and conventional x-ray means as illustrated and discussed with respect to FIG. 1. The second x-ray film is taken by positioning the same object or patient 16 in front of the film holder 12, preferably in exactly the same position or essentially the same position. The film cassette 20 is illustrated in greater detail in FIG. 3. For purposes of taking the second x-ray film, the cassette is loaded to include a front screen 60, the optical mask film 62, the second x-ray film 64 and, in this particular embodiment, a rear screen 66 which also acts as a door or a closure for the cassette 20. As known to those skilled in the art, the front 60 and rear screens 66 are used to double-expose the front and back of the second film 64, as is conventionally done in many applications. In this particular embodiment, the optical mask 62 is positioned so that the image thereon will be registered with respect to the image to be formed on the second film 64 upon the making of the x-ray.

Figure 3:
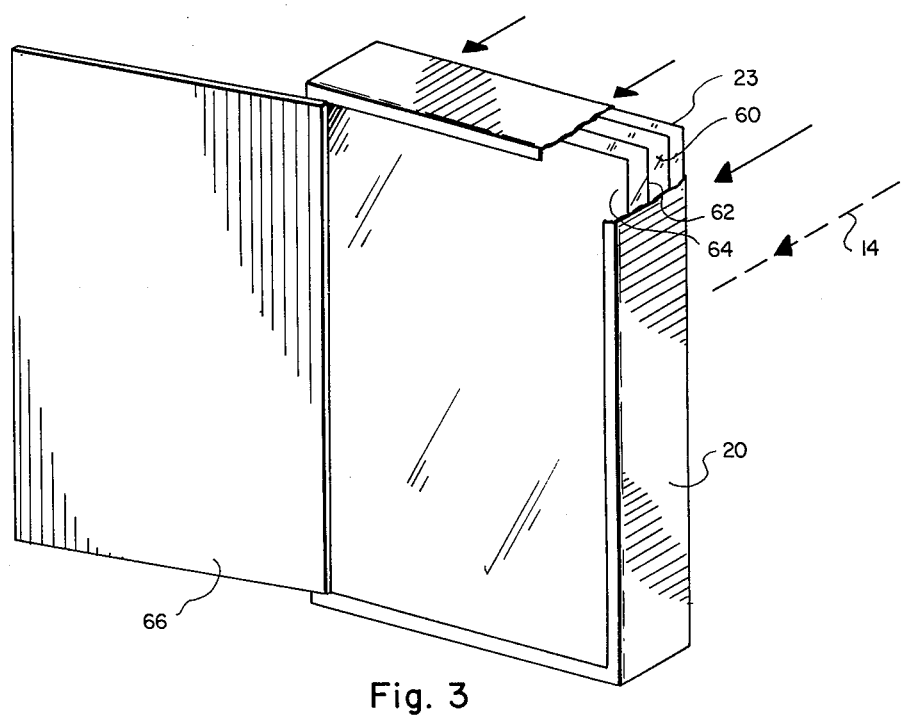
FIG. 3 is a perspective cut-away of an x-ray film cassette for use with x-ray means in practicing the method of the instant invention.

With the cassette of FIG. 3 loaded, as herein described, and the door 66 closed, the cassette 20 is positioned in the film holder 12 of FIG. 1 with the front screen 60 oriented to be the first in sequence from the machine 10. The patient or object 16 is repositioned essentially in the same position it was in for the taking of the first x-ray. The x-ray machine 10 is also preferably positioned in the same position it was in for the taking of the first x-ray. That is, the focus to film distance 18 should be selected to provide an appropriate view of the object on the film 64. Preferably, the film focus distance 18 is selected to be exactly the same as it was in the taking of the first x-ray film. However, it need not be. In this embodiment, the FFD for the second film is selected to be 3 meters.

The second x-ray is taken with the x-ray machine selected to operate between about 60 kVp and about 150 kVp, and preferably at about 120 kVp to about 140 kVp, with an anti-scatter grid using a film of moderate speed and contrast such as Kodak XL film 64 and screens of moderate to fast speed such as DuPont Quanta III screens 60 and 66. The film 64 is exposed for a period of time which is selected to be two to three times as long is the exposure time required for selected film-screen combination when used without the optical mask 62. The lengthened exposure period is necessary to permit x-ray radiation which does penetrate higher density areas (e.g., mediastinum) to integrate on the film to produce a more exposed, better contrast image. Because of the high transmittance of underexposed areas on the mask film, the light from the front screen 60 passes to the film 64 virtually unimpaired. In darker areas which are masked by the optical mask, overexposure does not result because the mask acts to reduce exposure in direct relation to the exposure of the first x-ray film. That is, the first x-ray film, and in turn the mask film, are direct reflections of the varying density of the object as to x-ray radiation. The mask film has dark (underexposed) areas in varying shades of gray which relate to areas of lower density which are well exposed (dark) on the first x-ray film. The varying shades of gray act to block a related portion of the light from the front screen 60 during the exposure of the second film 64 to prevent overexposure in those areas, and in turn maintain their optical contrast. In turn, the second x-ray film 64, when developed, has improved exposure and better optical contrast in previously underexposed areas while maintaining the exposure and contrast in the areas previously acceptable (exposed).

It should be noted that although the above embodiment describes the use of a front or entrance screen 60, as well as a rear screen 66, those skilled in the art will recognize that x-ray arrangements can be used within the teachings of this invention in which only a front or entrance screen 60 is used. In particular, the Kodak XL film is a double-sided film which can be exposed from both the front and the rear. Thus, it is desirable to use two screens, a front or entrance screen 60 and a rear or back screen 66. After exposure, the second x-ray film is developed for viewing, as known to those skilled in the art.

Figure 6:
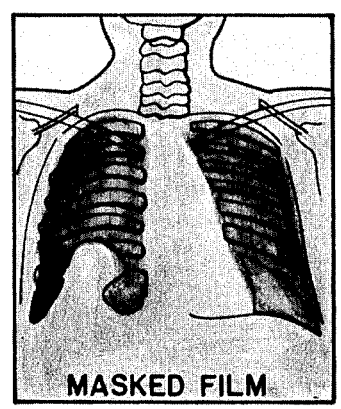
FIG. 6 is a representative shaded form of the second x-ray film made when practicing the method of the instant invention.
Figure 7:
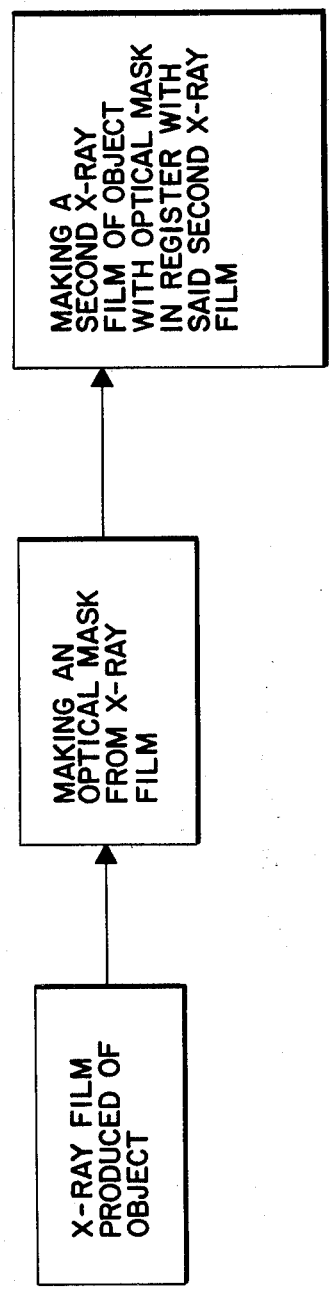
FIG. 7 is a flow sheet depicting the stages of making a first x-ray film containing an image of the object, preparing an optical mask from said first x-ray film and then making a second x-ray of said object with said optical mask in register with the second x-ray film.

The effect of the optical mask 62 is to permit an increase in film density or an increase in the degree of exposure and in turn optical contrast on the developed second x-ray film in those areas of the first x-ray film which are normally underexposed while maintaining exposure level or optical density in those acceptable areas, such as the lung fields, within an acceptable optical density/contrast range, as depicted in FIG. 6. The transmission of light from the front screen 60 to the film 64 through the mask 62 is about 60% to 80% (optical density from about 0.1 to about 0.15) in the underexposed or clear areas of the optical mask 62. The light transmission is from 1% to 10% (optical density of from about 1 to 2) in dark or exposed areas, such as the lung fields.

In comparison to conventional radiographs obtained at a similar kilovoltage, the masked radiographic image on the second x-ray film 64 has a noticeably improved balance in optical densities, as depicted in FIG. 6. There is specifically improved contrast in the mediastinal and otherwise underpenetrated areas which would otherwise appear as white or underexposed areas on the first x-ray film. However, because the mask is quite blurred local contrast of bone and soft tissue structures in the lung fields is not significantly degraded by the optical mask. Also, because the mask is quite blurred, one does not perceive any image from the mask itself on the final radiograph or second x-ray film. It has been established that repositioning of the object within an accuracy of ±1 centimeter for accurate registration of patient anatomy with the mask film can be readily achieved.

Referring back to FIG. 1, it should be noted that means 70 may be associated with the film holder 12 to sense the amount of radiation being received by the x-ray film. Such means may be any device which can integrate the total amount of radiation. Scintillation counters, ionization chamber devices or the like may be used to determine the amount of radiation being received by the film over time. At a preselected adjustable level, a signal can be sent by the timing means 70 via conductor means 72 to the x-ray machine 10 to automatically turn off the x-ray machine. Such means can be readily used to control and improve the quality of the x-ray film made, as herein discussed.

As stated herein, the degree of optical contrast visually observable within the masked and unmasked areas of the second x-ray film are not significantly affected by masking. The slopes of sensitometry curves for a representative x-ray film (such as the Kodak XL film herein suggested) are not significantly affected by the masking. Thus, even though the second x-ray film is masked, the overall optical contrast is not significantly degraded. At the same time, the exposure of the underexposed portions of the first x-ray on the second x-ray film is significantly improved and the optical contrast is the now more exposed portions is significantly improved. Evaluations using densitometers such as a Sakuri densitometer PDA-80, as well as DuPont CRONEX sensitometer, empirically support the visually observed improved optical exposure and concomitant improved contrast.

Image resolution is also not significantly affected by masking. Empirical evaluations using lead bar patterns with 4.5 to 5 line/pairs per millimeter resolution have been evaluated both with and without the mask. Image resolution was not significantly degraded while using masking techniques, as herein set forth. Referring specifically to FIGS. 4 and 6, it can be stated that improved exposure obtained with the masked film results in a better or more readable x-ray. The improved readability of the x-ray allows the interpretor to obtain more information and more accurately determine the diagnosis, as the case may be.

It may also be stated that the method herein set forth is of relatively low cost for the benefits received. That is, for the simple cost of a few more pieces of film and minimal apparatus, substantially improved quality radiographs may be obtained in the medical field, and in particular chest x-rays. Improved diagnosing and in turn improved benefits to patients should be obtained.

The embodiment discussed herein has been directed to the chest x-ray environment. Those skilled in the art will recognize that any object can be radiographed using the masking technique herein disclosed. Uses in industrial quality control are envisioned, as well as other non-medical radiographing areas.

Those skilled in the art will recognize that the details of the embodiment herein illustrated are not intended to limit the scope of the claims, which themselves recite those features which are regarded as essential to the invention.

We claim:

1. A method of radiography comprising:

the making of a first x-ray film of an object with said object and x-ray means positioned in first positions respectively to produce an image reflective of said object on said film, said object being of the type that said image on said film has underexposed portions with low optical contrast;

the making of an optical mask film from said first x-ray film by transferring the image of said object from said first x-ray film onto a photographically positive print film with duplicating means to produce an optically positive image reflective of said object with exposed portions related to the underexposed portions of said first x-ray film;

the making of a second x-ray film of said object with said object positioned essentially in its first position with said x-ray means positioned in a second position preselected to relate to the first position of said x-ray means, and with said optical mask film positioned and registered with respect to said second x-ray film and with respect to the image reflective of said object to be formed on said second x-ray film by said x-ray means to produce an optically masked image reflective of said object with the underexposed portions of said first x-ray film on said second x-ray film more exposed with higher optical contrast with respect to said first x-ray film.

2. The method of claim 1 wherein said first x-ray film is a conventional x-ray film taken by said x-ray means at a preselected voltage for a preselected exposure period with preselected film type, and wherein said second x-ray film is a conventional x-ray taken by said x-ray means at a preselected voltage for a preselected exposure period with preselected film type.

3. The method of claim 2 wherein said duplicating means includes optical blurring means to produce an optically blurred positive image reflective of the image on said first x-ray film.

4. The method of claim 3 wherein said duplicating means is a duplicating box of the type having means to pass from exterior to interior, said box exposing radiation to expose film positioned therewithin, and wherein said first x-ray film, said optical blurring means and said optical mask film are positioned sequentially interiorly from said means to pass, and wherein said optical mask film is exposed for a preselected period.

5. The method of claim 4 wherein said first x-ray film is fast type x-ray film and wherein said x-ray means includes a fast screen proximate said first x-ray film.

6. The method of claim 5 wherein said second x-ray film is moderate speed film and wherein said exposure period for said second x-ray film is from about two to about three times the exposure period for the selected film-screen combination used without the optical mask.

7. The method of claim 6 wherein said optical mask film is exposed for a period from about ten seconds to about five minutes to have an optical density for exposed portions thereof from about 0 to about 0.2 for portions corresponding to underexposed portions of the first x-ray film and about one to about two optical density units for those portions corresponding to adequately exposed regions of the first x-ray film.

8. The method of claim 7 wherein said x-ray means includes a conventional grid and wherein said preselected voltage is from about 60 kVp (kilo-volts-peak) to about 150 kVp for the taking of said first x-ray film.

9. The method of claim 8 wherein said second x-ray film is positioned within a film cassette having front and back x-ray screens with said second x-ray film positioned therebetween.

10. The method of claim 9 wherein said second x-ray film is exposed by said x-ray means at a preselected voltage from about 60 kVp (kilo-volt-peak) to about 150 kVp.

11. The method of claim 10 wherein said optical mask film is positioned within said cassette to be between the front screen and said second x-ray film.

12. The method of claim 11 wherein said x-ray means and said object are positioned to have a film to focus distance (FFD) of about 1 to about 3 meters for the making of both the first x-ray film and the second x-ray film.

13. The method of claim 1 wherein the x-ray means has timing means comprised of a sensor positioned proximate the x-ray film to receive and integrate the x-ray radiation incident thereto and conductors to conductively connect said sensor to means within the x-ray means to terminate x-ray transmission, wherein said sensor means receives x-ray radiation, integrates the amount received, and supplies a termination signal to the means within the x-ray means to terminate transmission thereof upon detection and integration of a preselected quantum of x-ray radiation.

14. A method of chest radiography comprising:

the making of a first chest x-ray film of a patient with said patient and x-ray means positioned in first positions respectively, with a focus to film (FFD) distance from about 1 meter to about three meters to produce an image reflective of the patient's chest on said film which has underexposed portions with low optical contrast, said first x-ray film being a fast type x-ray film, said x-ray means being operated at a preselected voltage of from about 120 kVp to about 140 kVp (kilo-volts-peak) for a preselected exposure period of about one-sixtieth (1/60) of a second, and said x-ray means including a fast screen and a grid;

the making of an optical mask film from said first x-ray film by transferring the chest image of the patient from said first x-ray film onto a photographically positive print film with a duplicating box and optical diffusing means to produce an optically blurred positive image reflective of the chest of the patient with exposed portions relating to the underexposed portions of said first x-ray film, wherein said box is of the type having means to pass from exterior to interior said box exposing radiation to expose film positioned therewithin, and wherein said first x-ray film, said optical diffusing means and said optical mask film are positioned sequentially interiorly from said means to pass, and wherein said optical mask film is exposed for a preselected period from about ten seconds to about five minutes so that the exposed portions of said film has an optical density from about 0 to about 0.2 optical density units in the underexposed regions of the first x-ray film, and about 1 to about 2 optical density units for those portions corresponding to adequately exposed regions of the first x-ray film; and the making of a second chest x-ray film of said patient with said patient and said x-ray means positioned essentially in their respective first positions, and with said optical mask film positioned and registered with respect to said second x-ray film and with respect to the image reflective of the patient's chest to be formed on said second x-ray film by said x-ray means to produce an optically masked image reflective of the patient's chest with those portions of said second x-ray film which relate to the underexposed portions of said first x-ray film more exposed with higher optical contrast with respect to said first x-ray film, said x-ray means being operated at a preselected voltage of from about 120 kVp to about 140 kVp for a preselected period of about two to about three times the exposure period required for the selected film-screen combination when used without the optical mask, said second x-ray film being moderate contrast, moderate speed film.

* * * * *